W. C. Gifford,
Stanchion.

No. 105,445.      Patented July 19, 1870.

Witnesses:
A. Bennenendorf
L. S. Mabee

Inventor:
W. C. Gifford
per
Attorneys.

United States Patent Office.

WALTER C. GIFFORD, OF JAMESTOWN, NEW YORK.

Letters Patent No. 105,445, dated July 19, 1870.

IMPROVEMENT IN SWINGING STANCHIONS.

The Schedule referred to in these Letters Patent and making part of the same

*To all whom it may concern:*

Be it known that I, WALTER C. GIFFORD, of Jamestown, in the county of Chautauqua and State of New York, have invented a new and useful Improvement in Swinging Stanchions; and I do hereby declare that the following is a full, clear, and exact description thereof, which will enable others skilled in the art to make and use the same, reference being had to the accompanying drawing forming part of this specification.

This invention relates to a new and useful improvement in the construction and arrangement of stanchions for securing cattle in stables or barns, and in all situations where stanchions are necessary for the confinement of animals; and It consists in the construction and arrangement hereinafter described.

In the accompanying drawing—

Similar letters of reference indicate corresponding parts.

Figure 1:
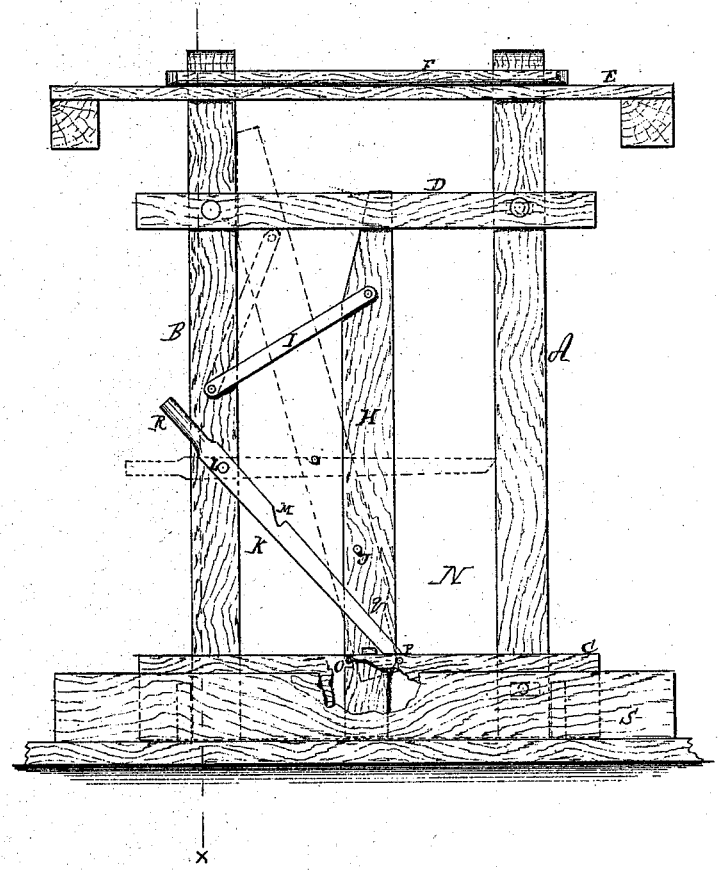
Figure 1 is a front elevation of the arrangement.
Figure 2:
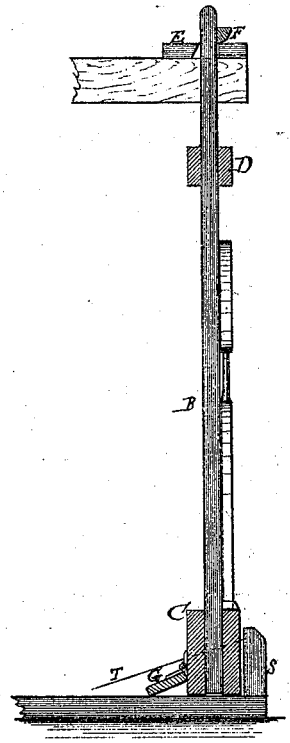
Figure 2 is a vertical section of fig. 1, on the line $x \, x$.

A B are upright stanchions, tied or fastened together by double transverse bars at their lower ends, as seen at C, and also near their upper ends, as seen at D.

An upright frame, rectangular in form, is thus made, which may be either fixed in position or made to swing back and forth, as may be desired.

In this example of my invention, the frame is suspended from the horizontal timber E by means of the bar F, to which the ends of the stanchions A B are attached. These ends pass up through mortises in E, and the bar F rests on E, and thereby supports the frame.

G is a scraper, hinged to the lower end of the frame, to prevent the feed of the animals from getting under the frame from the manger.

H is an adjustable stanchion, which is connected with the upright bar B by the rod I. This rod is pivoted to B and to H.

J is a pin, which projects from the side of the stanchion H.

K is a lever, which is pivoted to B, as seen at L.

M is a notch in the lever, which engages with the pin J.

As seen in the drawing, the stanchion H is closed, as when the neck of the animal is confined in space N.

There is a notch in the stanchion H which engages with a pin in the frame, as seen at O. The pressure of the animal's neck against the stanchion H serves to keep the stanchion in place.

There is a pin in the frame, as seen at P, and a rebatement and incline on the stanchion, as seen in dotted line at $q$, which, as the stanchion descends, serve to throw the stanchion in the opposite direction and catch it onto the pin, as seen at O.

To raise the stanchion for releasing the animal, the end R of the lever K is pressed down, by which the stanchion-lever and connecting-rod I are thrown into the position seen in dotted lines. The notch M engages with the pin J, which supports the stanchion, as seen.

S is a base-board, against which the swinging frame closes.

The movement in the other direction is limited by pins in the floor, brackets T, or in any other suitable manner.

The transverse pieces C and D are double, leaving a space between them in which the stanchion H works. The swinging movement allowed the stanchion makes itself adjusting to the neck of the animal in all the positions which the animal may occupy.

The advantages of this arrangement are, it requires no chain, rings, or iron hooks; it is simple and cheap, and may be constructed by any one at all acquainted with the use of tools.

The upright stanchion A is slotted, where the transverse bars C and D are fastened, so that it can be adjusted laterally, to fit the necks of different sized animals.

Having thus described my invention,

I claim as new and desire to secure by Letters Patent—

The arrangement of the hinged scraper G upon the swinging stanchion, as and for the purpose described.

Witnesses:     WALTER C. GIFFORD.
    D. C. COMSTOCK,
    W. S. FIRMAN.